United States Patent [19]

Bjorge

[11] Patent Number: 4,841,722
[45] Date of Patent: Jun. 27, 1989

[54] DUAL FUEL, PRESSURE COMBINED CYCLE

[75] Inventor: Robert W. Bjorge, Revere, Mass.

[73] Assignee: General Electric Company, Schenectady, N.Y.

[21] Appl. No.: 526,666

[22] Filed: Aug. 26, 1983

[51] Int. Cl.[4] ............................................. F02C 6/00
[52] U.S. Cl. ............................... 60/39.182; 60/39.511
[58] Field of Search ............... 60/39.182, 39.511, 646, 60/657; 110/203; 122/1 C

[56] References Cited

U.S. PATENT DOCUMENTS

| | | | |
|---|---|---|---|
| 3,194,015 | 7/1965 | Pacauh | 60/39.182 |
| 3,436,909 | 4/1969 | Squires | 60/39.182 |
| 4,173,949 | 11/1979 | Roethe | 122/1 C |
| 4,354,347 | 10/1982 | Tomlinson et al. | 60/39.182 |

FOREIGN PATENT DOCUMENTS

| | | | |
|---|---|---|---|
| 109708 | 8/1980 | Japan | 60/39.182 |
| 621186 | 1/1981 | Switzerland | 60/39.182 |
| 878976 | 11/1981 | U.S.S.R. | 60/39.182 |

Primary Examiner—Louis J. Casaregola
Assistant Examiner—T. S. Thorpe
Attorney, Agent, or Firm—Jerome C. Squillaro

[57] ABSTRACT

In a combined cycle power plant operable on either gas or liquid fuels maximum design efficiency is achieved at the lowest HRSG stack temperatures. This can be optimized for operation on natural gas but for liquid fuel operation consideration must be given to sulfur cold end corrosion. A feedwater recirculation loop is shown which allows for selectively heating feedwater during liquid fuel operation and for non-heating during gas operation. Economizer recirculation is also introduced to prevent economizer steaming.

3 Claims, 1 Drawing Sheet

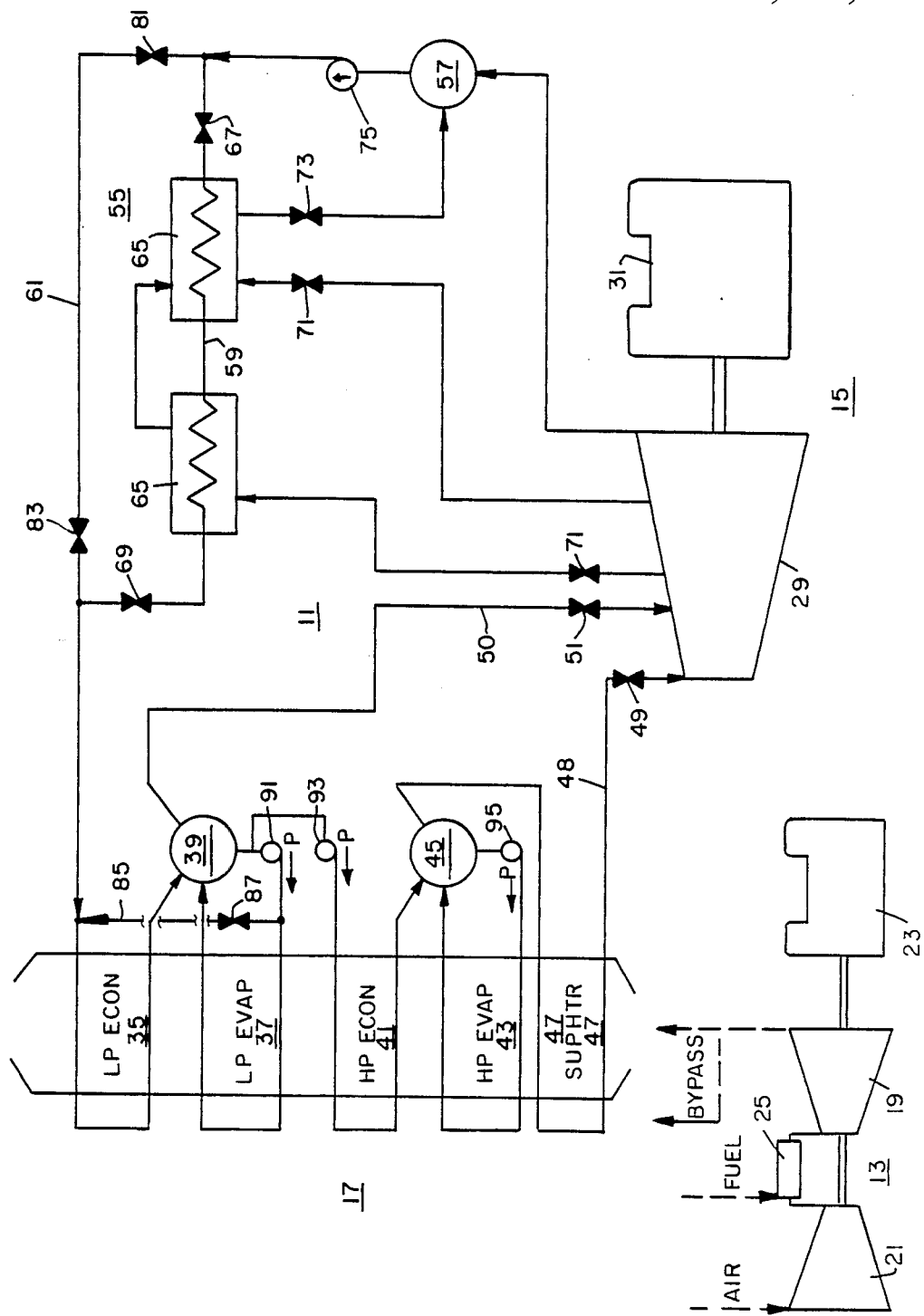

DUAL FUEL, PRESSURE COMBINED CYCLE

BACKGROUND OF THE INVENTION

This invention relates in general to combined cycle power plants and, in particular, to an improved performance dual fuel combined cycle power plant capable of utilizing both distillate (liquid fuel) and natural gas fuels.

A combined cycle power plant utilizes a gas turbine and a steam turbine in combination to produce power, typically electric power. The power plant is arranged so that the gas turbine is thermally connected to the steam turbine through a heat recovery steam generator (HRSG). The HRSG is a noncontact heat exchanger which allows feedwater for the steam generation process to be heated by otherwise wasted gas turbine exhaust gases. The HRSG is a large duct with tube bundles interposed therein whereby water is heated to steam as exhaust gases are passed through the duct. The primary efficiency of the combined cycle arrangement is, of course, due to the utilization of otherwise wasted gas turbine exhaust gases.

A key parameter in optimizing the combined cycle efficiency is that the highest efficiency is achieved at the lowest stack gas temperature measured at the outlet end of the HRSG. In a dual fuel combined cycle plant a limiting factor to achieving optimum efficiency is that a minimum tube surface temperature must be maintained in order to prevent the occurrence of sulfur cold end corrosion on the tube bundles. The inlet feedwater temperature affects the surface temperature of the turbine bundles, which must be maintained at a minimum temperature to prevent condensation of certain sulfur compounds produced by combustion of the liquid distillate fuels. The dew point of the corrosive sulfur compounds increases with increased concentration of sulfur in the fuel. No such limitation exists for gaseous fuels having negligible sulfur content.

The conventional method for optimizing a combined cycle plant efficiency is to design the HRSG and steam system to operate with an HRSG inlet feedwater temperature and a stack gas temperature that would prevent low temperature heat transfer surface corrosion commensurate with the highest level of sulfur content in the fuel expected to be burned in the specific application. If an alternate fuel such as natural gas is burned with lower fuel sulfur content, the HRSG stack gas temperature cannot be lowered to improve efficiency even though the sulfur compound concentration would allow it, since the HRSG inlet feedwater temperature is fixed. Conversely, if the HRSG were designed with inlet feedwater and stack gas temperatures commensurate with the lowest fuel sulfur content to be expected, the plant efficiency would be improved; however, the HRSG heat transfer surface would experience corrosion if fuel with a higher sulfur content were burned. This phenomenon is more fully explained in U.S. Pat. No. 4,354,347 assigned to the assignee of the present invention, issued Oct. 19, 1982 to Tomlinson and Cuscino and which is fully incorporated herein by reference.

The HRSG includes a plurality of interconnected tube bundles which may be identified from top to bottom (for the case of a vertical gas path) as an economizer, an evaporator and a superheater. The HRSG heat exchange process is a counterflow process in that the temperature of the hot exhaust gases decreases as they rise through the HRSG whereas the temperature of the steam water mixture in the tubes increases as it descends downwardly against the upward flow of hot exhaust gases.

It should be pointed out that dual fuel capability is a highly desirable attribute in power plant design since it will enable the operator to take advantage of fuel availability and cost factors. If maximum operational efficiency were not available in both modes then the attractiveness of dual fuel capability would be considerably lessened.

OBJECTS OF THE INVENTION

It is therefore an object of the present invention to provide a dual fuel combined cycle plant which overcomes the drawbacks of the prior art.

More specifically, it is an object of the present invention to provide a dual fuel combined cycle power plant capable of most efficient operation in both the liquid fired or gaseous fired modes.

It is another object of the invention to provide a feedwater recirculation loop between the steam turbine plant and the HRSG which selectively enables the operator to preheat feedwater during liquid fuel operation.

It is another object of the invention to allow the operator to bypass the feedwater heating process when the plant is being operated on natural gas.

It is a further object of this invention to enable the plant operator to fine tune feedwater temperature and economizer water flow rate in order to meet sulfur related requirements without the occurrence of "steaming" in the economizer section of the HRSG.

The novel features believed characteristic of the present invention are set forth in the appended claims. The invention itself, however, together with further objects and advantages thereof, may best be understood with reference to the detailed description of the invention and appended drawings.

SUMMARY OF THE INVENTION

The present invention is practiced in the environment of a dual fuel combined cycle power plant. The gas turbine is selectively operable on either liquid distillate fuel or natural gas. When operating on liquid distillate fuel a minimum temperature of the HRSG tube surface must be maintained in order to prevent sulfur cold end corrosion. A feedwater recirculation loop is used to preheat feedwater during liquid fuel operation and a bypass recirculation loop is utilized whenever the gas turbine is operating on natural gas. In addition, a conduit interconnects the evaporator with the economizer inlet and serves to increase both the economizer water flow rate and feedwater temperature during liquid fuel operation. This increased economizer water flow rate prevents "steaming" which would otherwise occur with the feedwater temperature elevated as required for corrosion-free liquid fuel operation. Feedwater heating in the feedwater recirculation loop is through extraction steam.

BRIEF DESCRIPTION OF THE DRAWING

The drawing is a schematic representation of a combined cycle power plant showing a feedwater recirculation loop in accordance with the present invention.

DETAILED DESCRIPTION OF THE INVENTION

A combined cycle power plant 11 includes a gas turbine power plant 13 and a steam turbine power plant 15 thermally interconnected through at least one heat recovery steam generator (HRSG) 17. The gas turbine power plant includes a gas turbine 19 drivingly connected to a compressor 21 and an electrical generator 23. A combustible mixture is formed and ignited in a combustor annulus only one of which combustors 25 being shown. The gas turbine combustor may be operated on natural gas or liquid distillate fuels. Hence, the combined cycle plant may be considered as possessing dual fuel capability.

The steam turbine power plant includes a steam turbine 29 which is drivingly connected to an electrical generator 31. In this configuration wherein there are two electrical generators driven by separate prime movers, the plant may be identified as a multi-shaft combined cycle power plant. Alternatively, both prime movers may be connected to a single generator in a configuration known as a single shaft combined cycle power plant.

Exhaust gas from the gas turbine power plant may be channeled through the HRSG 17 which may include a number of heating stages. The HRSG is a counterflow heat exchanger meaning that as feedwater progressively descends within the stack from economizer to superheater it is heated whereas as the exhaust gas ascends in the stack and gives up heat it will become cooler. The heating stages of the HRSG from low temperature end to high temperature end include a low pressure economizer 35 and a low pressure evaporator 37 associated with a low pressure steam drum 39; and, high pressure economizer 41 and high pressure evaporator 43 associated with steam drum 45. In addition, the output steam from steam drum 45 is delivered to superheater 47 whereupon it is passed through conduit 48 to steam turbine 29 through suitable control valves 49 only one of which is shown. In a two-pressure level HRSG as is shown, steam generated in the low pressure steam drum 39 is admitted into the steam turbine 29 at an intermediate stage through conduit 50 and control valves 51 only one of which is shown. Although the steam turbine is depicted as having one casing, it is well known that separate casings may be employed.

The present invention is preferably embodied in a feedwater recirculation loop 55 which interconnects the steam turbine deaerator condenser 57 with the inlet end of the HRSG at the low pressure economizer. The feedwater recirculation is comprised of a heater loop 59 and a bypass loop 61. The heater loop 59 may include one or more feedwater heaters 65 and an upstream isolation valve 67 and downstream isolation valve 69 for controlling feedwater flow through the heater loop. The feedwater heaters may for example be counterflow non-contact heat exchangers. Steam input into the feedwater heaters from low pressure turbine extraction points is controlled by means of extraction control valves 71. Valve 73 controls the flow of spent steam and hot water back to the deaerator condenser. Pump 75 pumps feedwater through the feedwater recirculation loop 55 to the HRSG. One advantage to the present invention is that the source of heating fluid to the feedwater recirculation loop is low pressure extraction steam. In previously known cycles such as that shown in U.S. Pat. No. 4,354,347 heretofore mentioned, a De-aerating Steam Supply Heater (DASSH) is heated by using higher pressure steam supplied from the HRSG or from an associated flash tank which is less efficient than drawing off extraction steam.

The bypass loop 61 includes upstream isolation valve 81 and downstream isolation valve 83 for controlling fluid flow through the bypass line during periods of plant operation on natural gas. The operation of the shut-off valves in both the heater loop and the bypass loop as well as the operation of the extraction control valves could be automated in a manner which would be obvious to one of ordinary skill in the art given the control objectives set forth herein.

An economizer recirculation loop 85 is integrated into the HRSG stack interconnecting the evaporator inlet with the economizer inlet. The purpose of the economizer recirculation loop is to provide additional feedwater flow to the economizer during periods of liquid fuel operation when the economizer inlet feedwater temperature is to be elevated so as to prevent the occurrence of "steaming" in the economizer. Valve 87 regulates the recirculation flow from the evaporator to the economizer. Pumps 91, 93 and 95 are self-explanatory from the schematic diagram and the direction of the flow arrows.

In operation, the present invention when applied to a dual fuel combined cycle power plant allows for highly efficient operation on natural gas while enabling the avoidance of cold end corrosion when operating on distillate fuels. Moreover, the utilization of extraction steam for heating feedwater rather than higher pressure admission steam or flashed steam present in a Deaerating Steam Supply Heater offers advantages in terms of thermal efficiency, equipment capital costs and performance reliability.

While the present invention has been disclosed in terms of its preferred embodiment as it is now known other modifications may occur to those having skill in the art. It is intended to cover in the appended claims all such modifications as fall within their true spirit and scope.

What is claimed is:

1. A dual fuel combined cycle power plant including at least one gas turbine and at least one steam turbine thermally interconnected through at least one heat recovery steam generator; the combined cycle power plant selectively operable on liquid or gas fuels and including an improved feedwater recirculation loop connecting the steam turbine and heat recovery steam generator wherein the improvement comprises:
   a heater loop including at least one feedwater heater connected to receive extraction steam from the steam turbine and including an upstream and downstream feedwater flow isolation valve; and,
   a bypass loop including an upstream and downstream feedwater flow isolation valve, the heater loop and bypass loop being connected in parallel; and, the heater loop valves open during liquid fuel operation; and, the bypass loop valves open during gas fuel operation.

2. The combined cycle power plant recited in claim 1 wherein the heat recovery steam generator includes at least one economizer and at least one evaporator interconnected through a steam drum and further comprises:
   an economizer recirculation loop connected between the evaporator and the economizer inlets; and,
   valve means in the economizer recirculation loop open during liquid fuel operation for increasing fluid flow through the economizer.

3. A dual fuel combined cycle power plant including at least one gas turbine and at least one steam turbine thermally interconnected through at least one heat recovery steam generator, the heat recovery steam generator including a low pressure economizer, a low pressure evaporator, a low pressure steam drum, a high pressure economizer, a high pressure evaporator, a superheater and a high pressure steam drum; the combined cycle power plant selectively operable on liquid or gas fuels and further comprising:

a feedwater recirculation loop including a heater loop with isolation valve means having at least one feedwater heater connected to receive extraction steam from the steam turbine during liquid fuel operation and a bypass loop with isolation valve means connected in parallel with the heater loop for bypassing the feedwater heater during gas fuel operation;

an economizer recirculation loop with valve means connected between the low pressure evaporator inlet and the low pressure economizer inlet for increasing feedwater flow through the low pressure economizer during liquid fuel operation.

* * * * *